US012680674B1

(12) United States Patent
Zou

(10) Patent No.: US 12,680,674 B1
(45) Date of Patent: Jul. 14, 2026

(54) LAMP CAP CONNECTING STRUCTURE WITH STABLE CONNECTION

(71) Applicant: Xinjiang Zou, Meizhou (CN)

(72) Inventor: Xinjiang Zou, Meizhou (CN)

( * ) Notice: Subject to any disclaimer, the term of this patent is extended or adjusted under 35 U.S.C. 154(b) by 0 days.

(21) Appl. No.: 19/387,369

(22) Filed: Nov. 12, 2025

(51) Int. Cl.

| | |
|---|---|
| ***F21V 17/00*** | (2006.01) |
| ***F21V 17/06*** | (2006.01) |
| ***F21V 17/08*** | (2006.01) |
| ***F21V 31/00*** | (2006.01) |

(52) U.S. Cl.
CPC .......... *F21V 17/002* (2013.01); *F21V 17/005* (2013.01); *F21V 17/06* (2013.01); *F21V 17/08* (2013.01); *F21V 31/005* (2013.01)

(58) Field of Classification Search
CPC .... F21V 31/005; F21V 17/002; F21V 17/005; F21V 17/06; F21V 17/08
See application file for complete search history.

(56) References Cited

U.S. PATENT DOCUMENTS

| | | | | |
|---|---|---|---|---|
| 10,186,793 | B2 * | 1/2019 | Chen | F21V 23/004 |
| 12,247,721 | B1 * | 3/2025 | Chen | F21V 23/06 |
| 12,352,414 | B1 * | 7/2025 | Yan | F21V 17/16 |
| 12,474,033 | B1 * | 11/2025 | Wang | F21V 17/164 |
| 12,601,467 | B2 * | 4/2026 | You | F21V 19/004 |

* cited by examiner

*Primary Examiner* — Gerald J Sufleta, II
(74) *Attorney, Agent, or Firm* — Birchwood IP

(57) ABSTRACT

The present invention discloses a lamp cap connecting structure with stable connection, comprising a light-emitting body, a lamp cap shell and a lamp cap assembly, wherein the lamp cap assembly comprises a connecting piece I and a connecting piece II, and the connecting piece II is snap-fitted on a top of the connecting piece I for fixing an external cable. The connecting piece I and the connecting piece II are connected and fixed in a buckling mode or a screwing mode, the lamp cap shell and the connecting piece I are connected and fixed in a buckling mode and a screwing mode, thereby being convenient to install. The light-emitting body is installed on the connecting piece I, and the design of a limiting structure is adopted between the inner wall of the lamp cap shell and an outer wall of the connecting piece I.

11 Claims, 16 Drawing Sheets

LAMP CAP CONNECTING STRUCTURE WITH STABLE CONNECTION

TECHNICAL FIELD

The present invention relates to a lamp cap connecting structure with stable connection, and belongs to the technical field of lighting.

BACKGROUND

Hanging lamps are generally installed by means of snap fitting and screw joint.

With respect to the hanging lamp installed by means of screw joint, for a small light-emitting body structure, a small lamp cap can be designed accordingly, but for a large light-emitting body structure, a large lamp cap structural piece is generally designed. However, this design has a relatively high material cost. Therefore, a combined lamp cap structure is mostly adopted, that is, outside an inner lamp cap fixed to a light-emitting body, an outer lamp cap structure that matches the light-emitting body is designed.

In existing design, for the design of a combined lamp cap, there is either a problem of high processing cost, or a problem of dropping caused by unstable connection which may exist between the inner lamp cap and an outer lamp cap, or a problem of an influence on installation caused by rotation of the inner lamp cap and the outer lamp cap during installation.

SUMMARY

In view of the above problems in the prior art, the purpose of the present invention is to provide a lamp cap connecting structure with stable connection. By optimizing the structure, the stable fixation of lamp cap connection is achieved. The overall structure is limited by means of snap fitting, which is convenient for installation. Moreover, limiting rib structures are adopted to achieve an anti-rotation function.

To achieve the above purpose, the present invention adopts the following technical solution:

A lamp cap connecting structure with stable connection comprises a light-emitting body, a lamp cap shell and a lamp cap assembly, wherein the lamp cap assembly comprises a connecting piece I and a connecting piece II; the connecting piece II is snap-fitted on a top of the connecting piece I for fixing an external cable; the connecting piece I is mounted on an inner wall of the lamp cap shell for connecting the light-emitting body; the top of the connecting piece I is connected to the connecting piece II; the top of the connecting piece I is provided with an installing groove; the connecting piece II is mounted in the installing groove; both sides of the connecting piece II are provided with snap-fit features I; ends of the snap-fit features I are of hook structures; correspondingly, an inner wall of the connecting piece I is provided with a limiting lug boss I; the inner wall of the lamp cap shell is provided with limiting ribs; a top end of each limiting rib is provided with a limiting lug boss II; a bottom end of each limiting rib is provided with a snap-fit feature II; an end of the snap-fit feature II is of a hook structure; and during assembling, the top of the connecting piece I is abutted against the limiting lug boss II, and an edge of a bottom port of the connecting piece I is abutted against the snap-fit feature II.

Preferably, an outer wall of the connecting piece I is provided with a limiting strip; both sides of the limiting strip are provided with grooves I docked with the limiting ribs; no gap is present between the limiting strip and the grooves I on both sides of the limiting strip; when the limiting ribs are located in the grooves I, the limiting ribs are attached to the limiting strip, and the limiting ribs on both sides clamp the limiting strip to prevent relative displacement; and the structure is designed as a first set of limiting structures to prevent the connecting piece I and the lamp cap shell from rotating in a process of screwing in a light-emitting body, to avoid affecting the installation.

Preferably, the outer wall of the connecting piece I is provided with a groove II on the other side opposite to the limiting strip; during assembling, the limiting ribs are located in the groove II; the groove II and the grooves I on both sides of the limiting strip form an isosceles triangle limiting structure; and when the limiting ribs are located in the grooves I and the groove II respectively, further limiting is performed to effectively prevent the connecting piece I and the lamp cap shell from rotating in the process of screwing in the light-emitting body, to avoid affecting the installation.

Preferably, a main body of the connecting piece II is a cylindrical structural piece, and is provided with limiting pieces on both sides; the limiting pieces are of structures protruding outwardly from both sides of the main body of the connecting piece II; the limiting pieces and the connecting piece II are all installed in the installing groove; an inner wall of the installing groove is attached to an outer wall of the main body of the connecting piece II; and through the limiting pieces of the connecting piece II, structural limiting is adopted to prevent the connecting piece II and the connecting piece I from rotating.

Preferably, a side of the connecting piece II opposite to the connecting piece I is provided with a wire crimping groove used for limiting an external cable; and the overall structure is compact and easy to implement.

Preferably, a top of the lamp cap shell is provided with a wire guide hole located between the limiting ribs docked with the grooves I and the groove II, and is also provided with no less than two limiting ribs, and correspondingly, an outer wall of the connecting piece I is provided with no less than two grooves I; in addition to the isosceles triangular limiting structure, other added limiting ribs and the grooves I further perform limiting to prevent the connecting piece I and the lamp cap shell from rotating in the process of screwing in the light-emitting body, to avoid affecting the installation.

Preferably, the limiting ribs are integrally formed structural pieces on the inner wall of the lamp cap shell, are overall of sheet-like structures, and are in attached contact with the grooves I and the groove II on the outer wall of the connecting piece I; and the whole is simple to form, which saves processing cost.

Preferably, an edge of the wire guide hole on the top of the lamp cap shell is provided with a structure of a thin film, and the thin film has an inclined surface from a position close to a wire to the top of the lamp cap shell from top to bottom, to achieve a waterproof effect.

Preferably, both sides of the top of the main body of the connecting piece II are provided with snap-fit features III symmetrically; correspondingly, the connecting piece I is provided with clamping grooves; during assembling, the snap-fit features III are located in the clamping grooves; the inner wall of the lamp cap shell is provided with a ring-shaped limiting plate; the limiting plate is provided with notches symmetrically; and a length of the notches is not less than a width of the snap-fit features III. This is a second connection mode between the connecting piece I and the lamp cap shell. The snap-fit features III are connected to the ring-shaped limiting plate through the notches. After rotation, the snap-fit features III are hung and buckled on the ring-shaped limiting plate to form limiting.

Preferably, a length of the snap-fit features III is not less than an outside diameter of the connecting piece I. Only when a length difference is present, that is, when the limiting structure extends from an outer contour of the connecting piece I, it can achieve that the connecting piece II and the connecting piece I are hung as a whole on the inner wall of the lamp cap shell.

Preferably, an outside diameter of the main body of the connecting piece II is greater than the outside diameter of the connecting piece I, and the limiting ribs on the inner wall of the lamp cap shell are provided with limiting grooves of an equal height. This is a third connection mode between the connecting piece I and the lamp cap shell. During assembling, due to the particular elasticity of the limiting ribs, a part, which exceeds the outer contour of the connecting piece I, of an outer contour of the main body of the connecting piece II is buckled into the limiting grooves, which can achieve that the connecting piece II and the connecting piece I are hung as a whole on the inner wall of the lamp cap shell.

Preferably, the inner wall of the lamp cap shell is designed as a cylindrical limiting grooved plate; a bottom of the limiting grooved plate is provided with a clamping groove II; the lamp cap assembly is designed as an integrated structure, and an outer wall of the lamp cap assembly is provided with a snap-fit feature IV; and during assembling, the snap-fit feature IV is located in the clamping groove II, thereby further simplifying the structure. The lamp cap assembly is used as the integrated structure. A wire crimping groove is mounted in the limiting grooved plate, the wire is snap-fitted on the inner wall of the limiting grooved plate, and the lamp cap assembly is installed on the inner wall of the lamp cap shell in the form of snap fitting. During assembling, a hardware terminal is hinged to an end of the wire and directly inserted into the wire crimping groove; and then, the light-emitting body and the lamp cap assembly are snap-fitted together on the inner wall of the lamp cap shell, to form installation.

Beneficial Effects

Compared with the prior art, the present invention has the beneficial effects as follows:

The top of the connecting piece I is abutted against the limiting lug bosses II of the limiting ribs on the inner wall of the lamp cap shell, and the bottom of the connecting piece I is abutted against the snap-fit features II of the limiting ribs, so as to prevent the connecting piece I from shifting in a longitudinal direction of the lamp cap shell.

After assembling, the grooves I and the groove II on the outer wall of the connecting piece I cooperate with the limiting ribs in the grooves I between the grooves I and the groove II, to achieve multi-set limiting, so as to prevent the connecting piece I from rotating and shifting in a transverse direction of the lamp cap shell.

Connection and fixation modes of snap fitting are adopted between the connecting piece I and the connecting piece II, and between the connecting piece I and the lamp cap shell, so that overall assembling is convenient and fast, which saves the installation cost.

The edge of the wire guide hole on the top of the lamp cap shell is provided with the structure of the thin film, which achieves a stable waterproof effect through the tension effect of the material.

DESCRIPTION OF EMBODIMENTS

Figure 1:
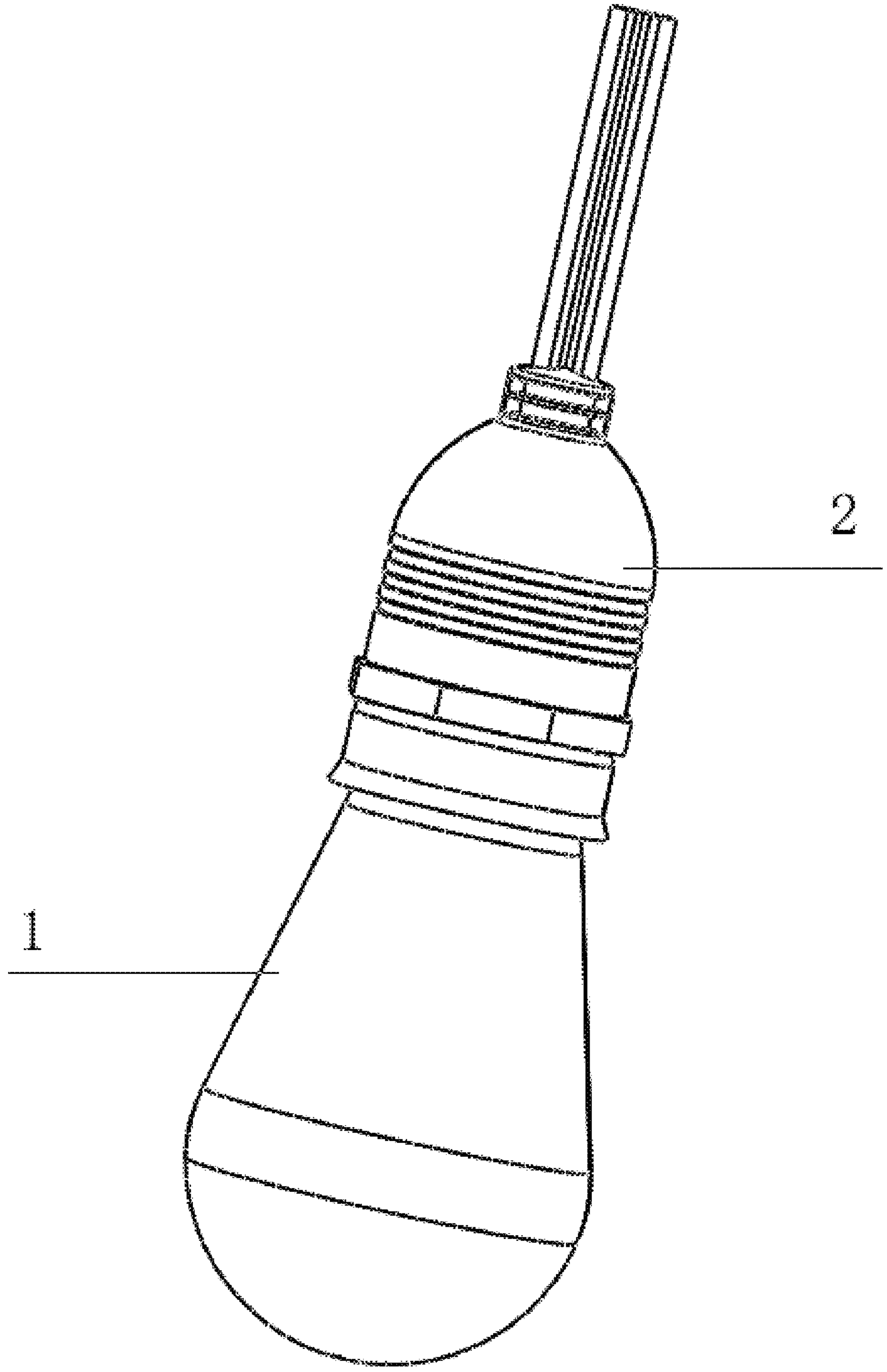
FIG. 1 is a structural schematic diagram of a preferred embodiment of a lamp cap connecting structure with stable connection provided by the present invention.
Figure 2:
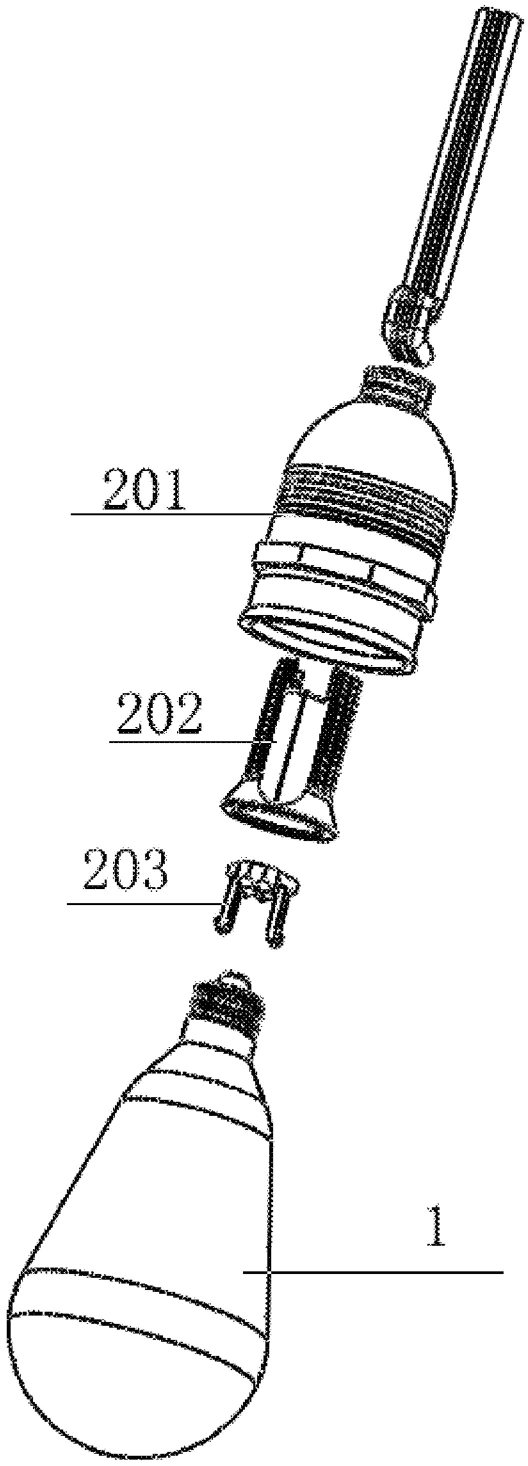
FIG. 2 is a structural schematic diagram of a preferred embodiment of a lamp cap connecting structure with stable connection provided by the present invention.
Figure 3:
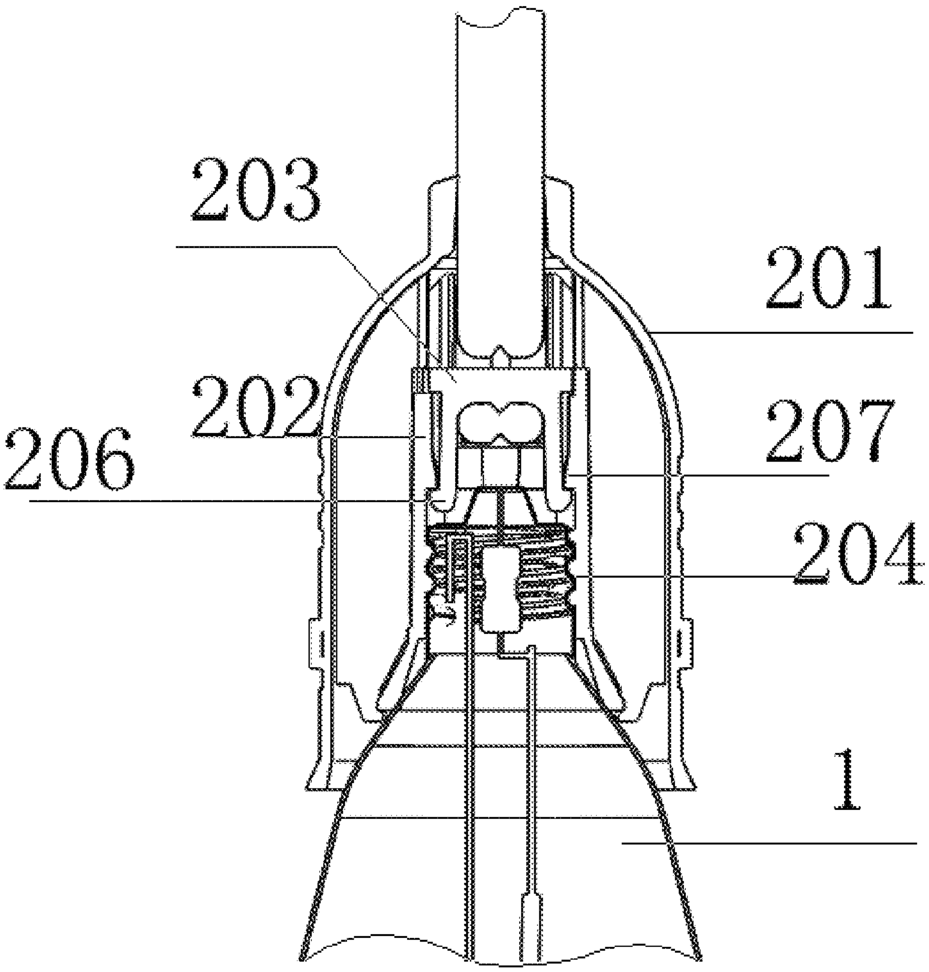
FIG. 3 is a structural schematic diagram of a preferred embodiment of a lamp cap connecting structure with stable connection provided by the present invention.

For the convenience of understanding the present invention, the present application will be described below more comprehensively with reference to relevant drawings. Preferred implementations of the present invention are given in the drawings. However, the present invention may be achieved in many different forms and will not be limited to the implementations described herein. On the contrary, the purpose of providing these implementations is to understand the disclosure in the present invention more thoroughly and comprehensively.

It should be noted that the terms “perpendicular”, “horizontal”, “upper”, “lower”, “left”, “right” and similar expressions used herein are just for the purpose of illustration, and do not indicate the only implementation.

Unless otherwise defined, all technical and scientific terms used herein have the same meanings as those generally understood by those skilled in the art in the present invention. The terms used in the description of the present invention herein are intended to merely describe concrete implementations, not to limit the present invention. The term “and/or” used herein comprises any and all of combinations of one or more related listed items.

By referring to FIG. 1 to FIG. 5, which are overall structural schematic diagrams of a lamp cap connecting structure with stable connection provided by the present invention. The lamp cap connecting structure comprises a light-emitting body 1, a lamp cap shell 201 and a lamp cap assembly 2; the lamp cap assembly 2 comprises a connecting piece I202 and a connecting piece II203, the connecting piece II203 is snap-fitted on a top of the connecting piece I202 for fixing an external cable, and the connecting piece I202 is mounted on an inner wall of the lamp cap shell 201 for connecting the light-emitting body 1; the top of the connecting piece I202 is connected to the connecting piece II203; an inner wall of the connecting piece I202 is provided with a screw thread 204; the light-emitting body 1 is fixed to the bottom of the connecting piece I202 by a threaded connection mode; in addition, the connection modes between the light-emitting body 1 and a lamp body belong to the prior art, and also include other modes such as snap fitting, besides the threaded connection mode, which will not be described in detail here; the top of the connecting piece I202 is provided with an installing groove 205; the connecting piece II203 is mounted in the installing groove 205; both sides of the connecting piece II203 are provided with snap-fit features I206; ends of the snap-fit features I206 are of hook structures; correspondingly, an inner wall of the connecting piece I202 is provided with a limiting lug boss I207; during assembling, the ends of the snap-fit features I206 are abutted against the limiting lug boss I207; the inner wall of the lamp cap shell 201 is provided with limiting ribs 208; a top of each limiting rib 208 is provided with a limiting lug boss II209; a bottom end of each limiting rib 208 is provided with a snap-fit feature II210; an end of the snap-fit feature II210 is of a hook structure; and during assembling, the top of the connecting piece I202 is abutted against the limiting lug boss II209, and an edge of a bottom port of the connecting piece I202 is abutted against the snap-fit feature II210, to prevent the connecting piece I202 and the lamp cap shell 201 from shifting in a longitudinal direction.

Figure 5:
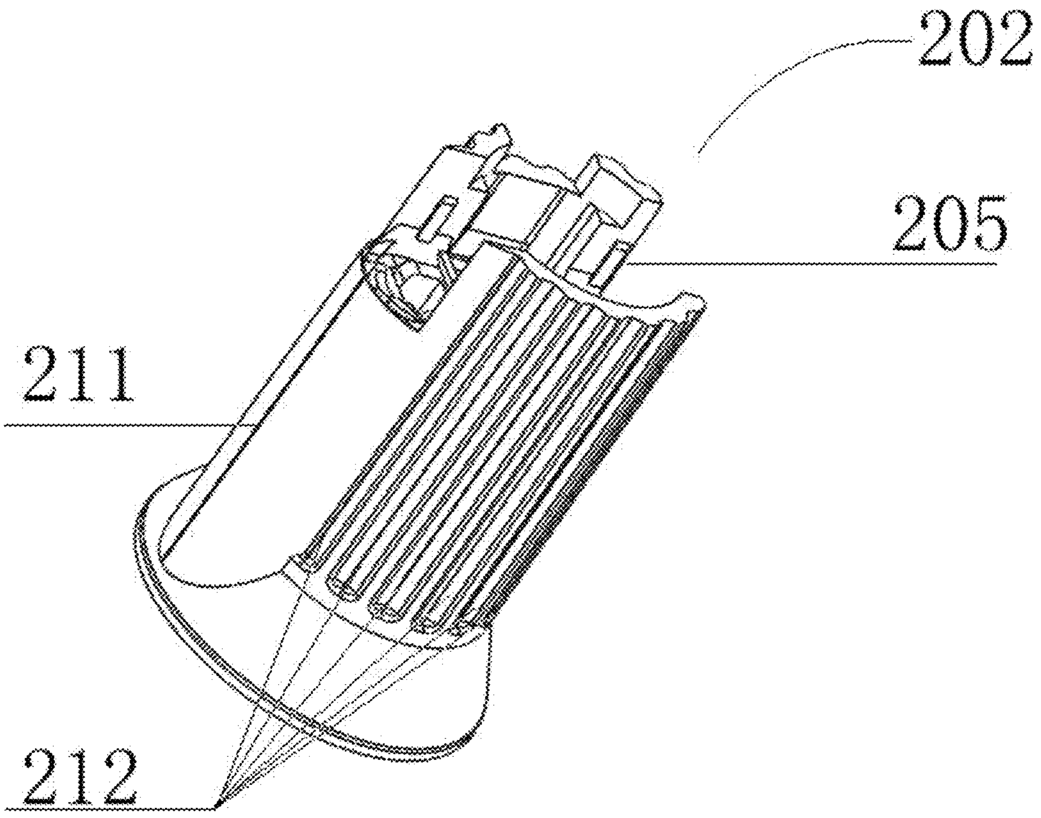
FIG. 5 is a schematic diagram of installation of a preferred embodiment of a lamp cap connecting structure with stable connection provided by the present invention.
Figure 6:
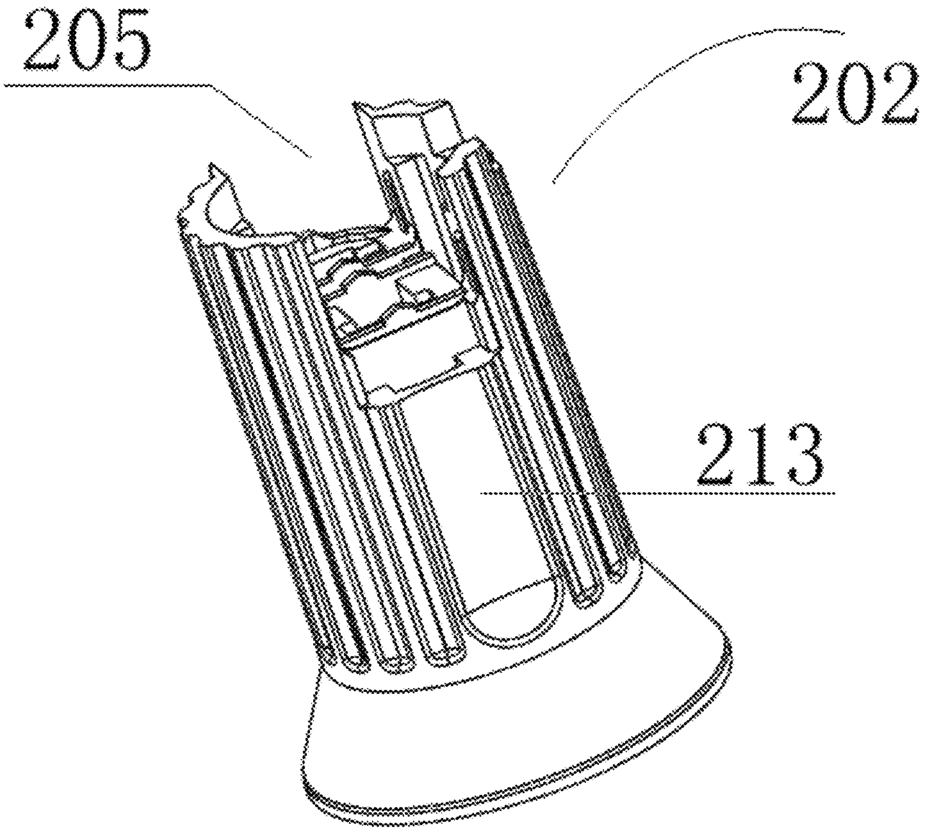
FIG. 6 is a schematic diagram of installation of a preferred embodiment of a lamp cap connecting structure with stable connection provided by the present invention.

Embodiment 1: As shown in FIG. 5 and FIG. 6, an outer wall of the connecting piece I202 is provided with a limiting strip 211; both sides of the limiting strip 211 are provided with grooves I212 docked with the limiting ribs 208; no gap is present between the limiting strip 211 and the grooves I212 on both sides of the limiting strip 211; when the limiting ribs 208 are located in the grooves I212, the limiting ribs 208 are attached to the limiting strip 211; the outer wall of the connecting piece I202 is provided with a groove II213 on the other side opposite to the limiting strip 211; during assembling, the limiting ribs 208 are located in the groove II213; and in a transverse section, the grooves I212 and the groove II213 are presented as isosceles triangles.

Figure 4:
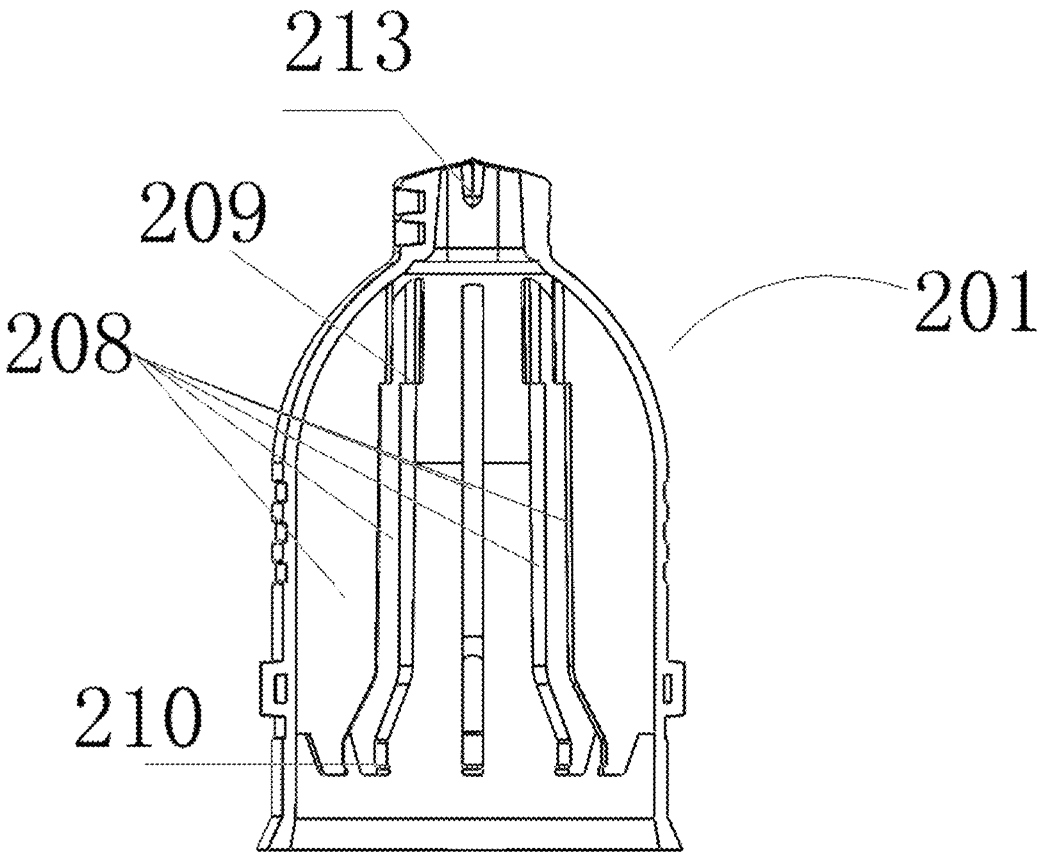
FIG. 4 is a schematic diagram of installation of a preferred embodiment of a lamp cap connecting structure with stable connection provided by the present invention.

Embodiment 2: On the basis of embodiment 1, as shown in FIG. 4 to FIG. 6: a top of the lamp cap shell 201 is provided with a wire guide hole 214 located between the limiting ribs 208 docked with the grooves I212 and the groove II213, and is also provided with no less than two limiting ribs 208, and correspondingly, an outer wall of the connecting piece I202 is provided with no less than two grooves I212. Taking into account both material cost and structural stability comprehensively, three limiting ribs 208 are also arranged, which are located between the limiting ribs 208 docked with the grooves I212 and the groove II213. Correspondingly, the outer wall of the connecting piece I202 is provided with three grooves I212. Generally, the inner wall of the lamp cap shell 201 is provided with one limiting rib 208 docked with the groove II213 and eight limiting ribs 208 docked with the grooves I212, with a total of nine limiting ribs 208. It is worth noting that, according to practical specifications, dimensions and sizes, as well as practical usage demands, the number of the limiting ribs is increased or decreased. The limiting ribs 208 are integrally formed structural pieces on the inner wall of the lamp cap shell 201, are overall of sheet-like structures, and are in attached contact with the grooves I212 and the groove II213 on the outer wall of the connecting piece I202. This effectively prevents the connecting piece I202 from rotating and shifting in a transverse direction of the lamp cap shell 201.

Figure 7:
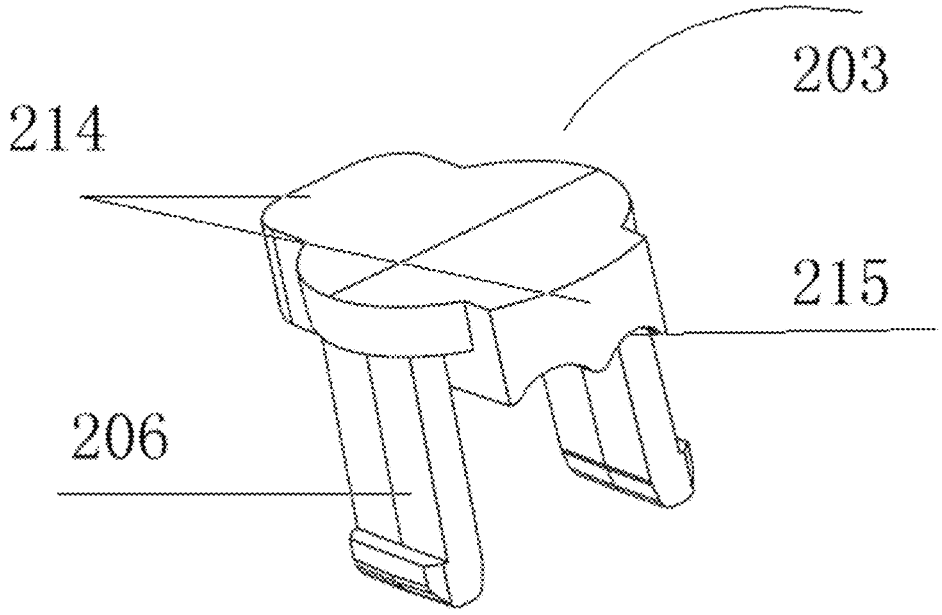
FIG. 7 is a schematic diagram of installation of a preferred embodiment of a lamp cap connecting structure with stable connection provided by the present invention.

Embodiment 3: As shown in FIG. 7, a main body of the connecting piece II203 is a cylindrical structural piece, and is provided with limiting pieces 214 on both sides; the limiting pieces 214 are of structures protruding outwardly from both sides of the main body of the connecting piece II203; the limiting pieces 214 and the connecting piece II203 are all installed in the installing groove 205; an inner wall of the installing groove 205 is attached to an outer wall of the main body of the connecting piece II203; and a side of the connecting piece II203 opposite to the connecting piece I202 is provided with a wire crimping groove 215. A limiting structure formed by snap fitting between the connecting piece I202 and the connecting piece II203 plays a role in the limiting installation of an external cable. An outer contour of the connecting piece II203 is fitted with an inner contour of the installing groove 205 of the connecting piece I202. Moreover, due to the limiting of the limiting pieces 214, in a transverse direction, the connecting piece II203 and the connecting piece I202 do not rotate, and in a longitudinal direction, the ends of the snap-fit features I206 of the connecting piece II203 are abutted against the limiting lug boss I207 of the connecting piece I202, without movement; and in conjunction with the wire crimping groove 215, the external cable can be stably fixed.

Figure 8:
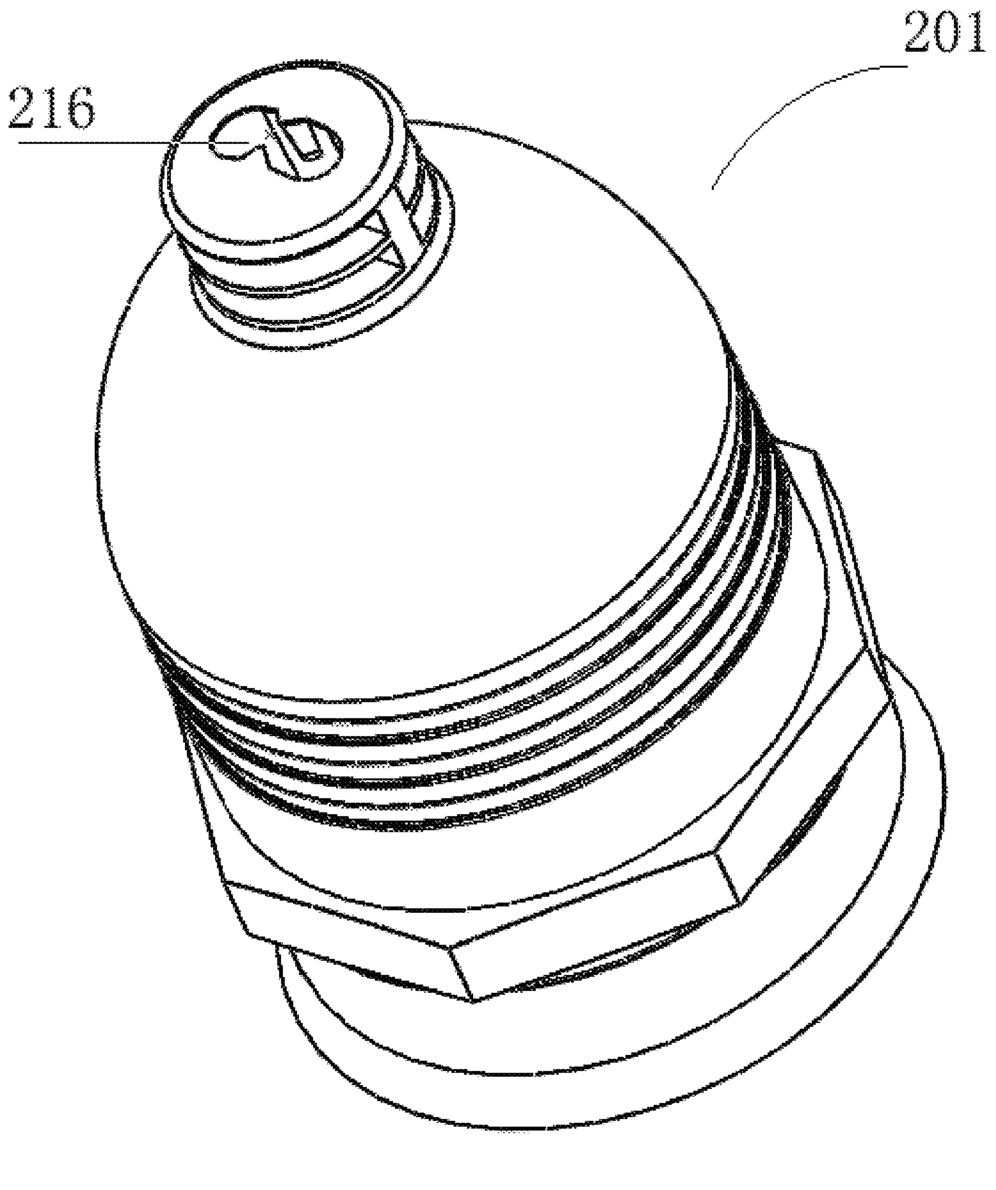
FIG. 8 is a schematic diagram of installation of a preferred embodiment of a lamp cap connecting structure with stable connection provided by the present invention.

Embodiment 4: As shown in FIG. 8, an edge of the wire guide hole 214 on the top of the lamp cap shell 201 is provided with a structure of a thin film 216, and the thin film 216 has an inclined surface from a position close to a wire to the top of the lamp cap shell from top to bottom. A stable waterproof effect is achieved through the tension effect of the material and the diversion of the inclined surface.

Figure 9:
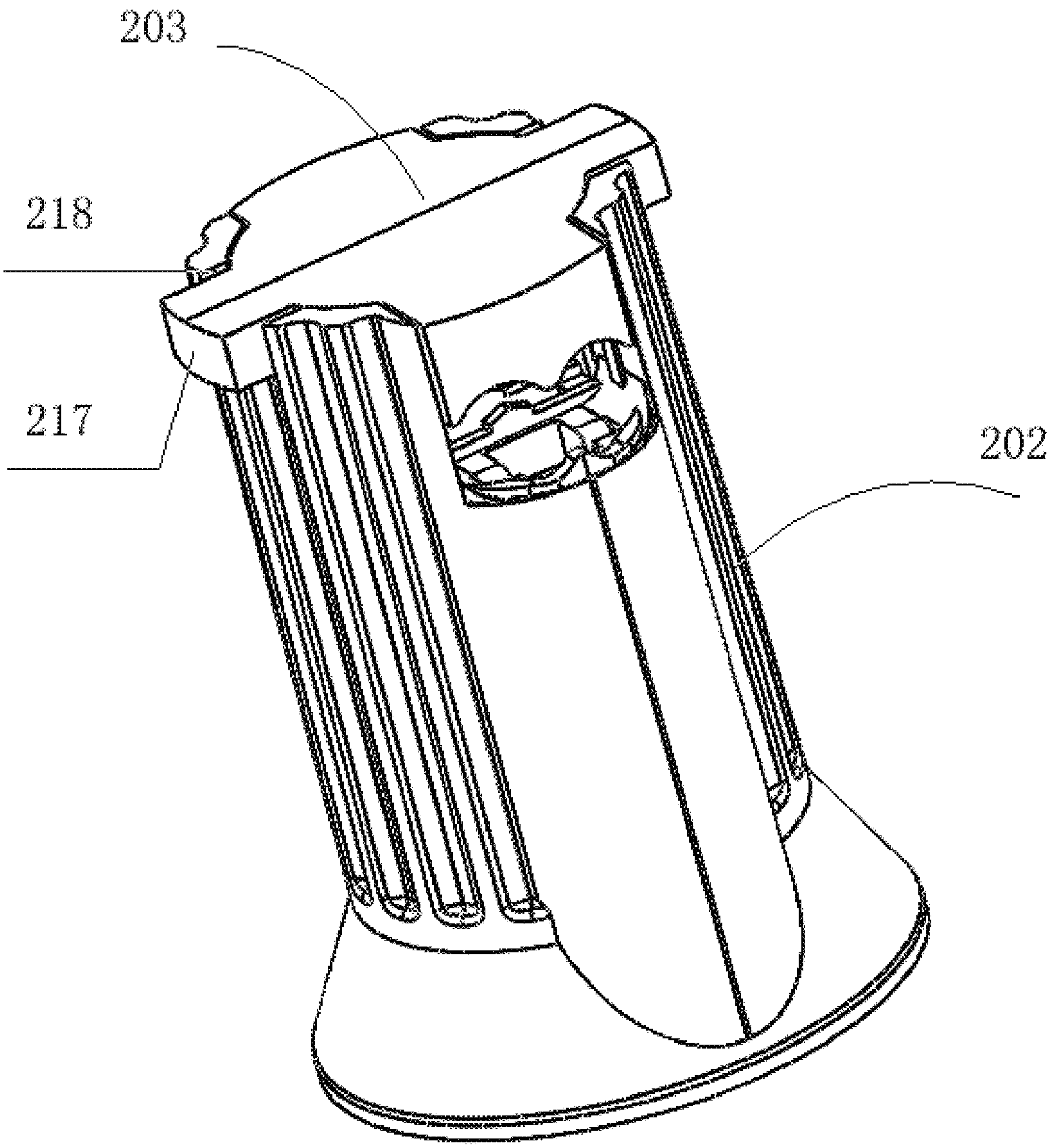
FIG. 9 is a schematic diagram of installation of a preferred embodiment of a lamp cap connecting structure with stable connection provided by the present invention.
Figure 10:
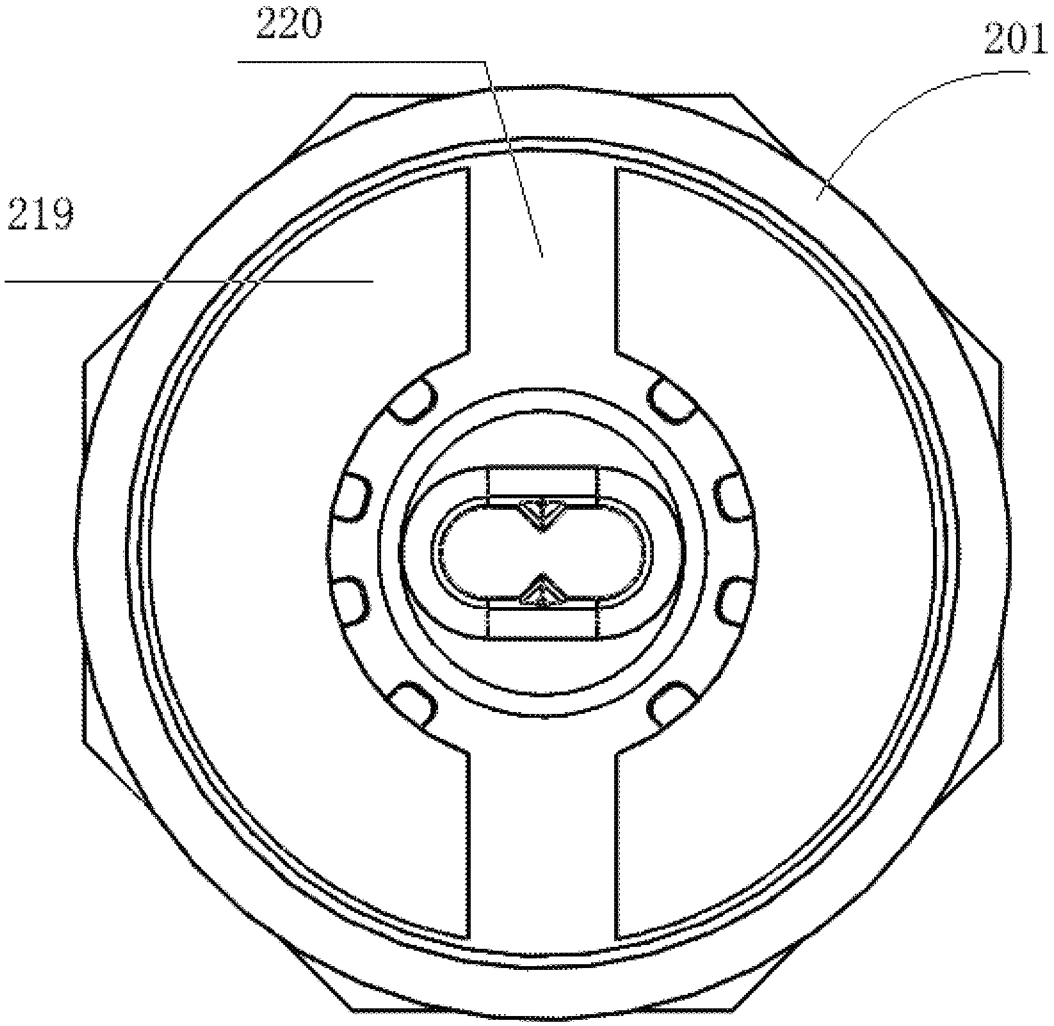
FIG. 10 is a schematic diagram of installation of a preferred embodiment of a lamp cap connecting structure with stable connection provided by the present invention.
Figure 11:
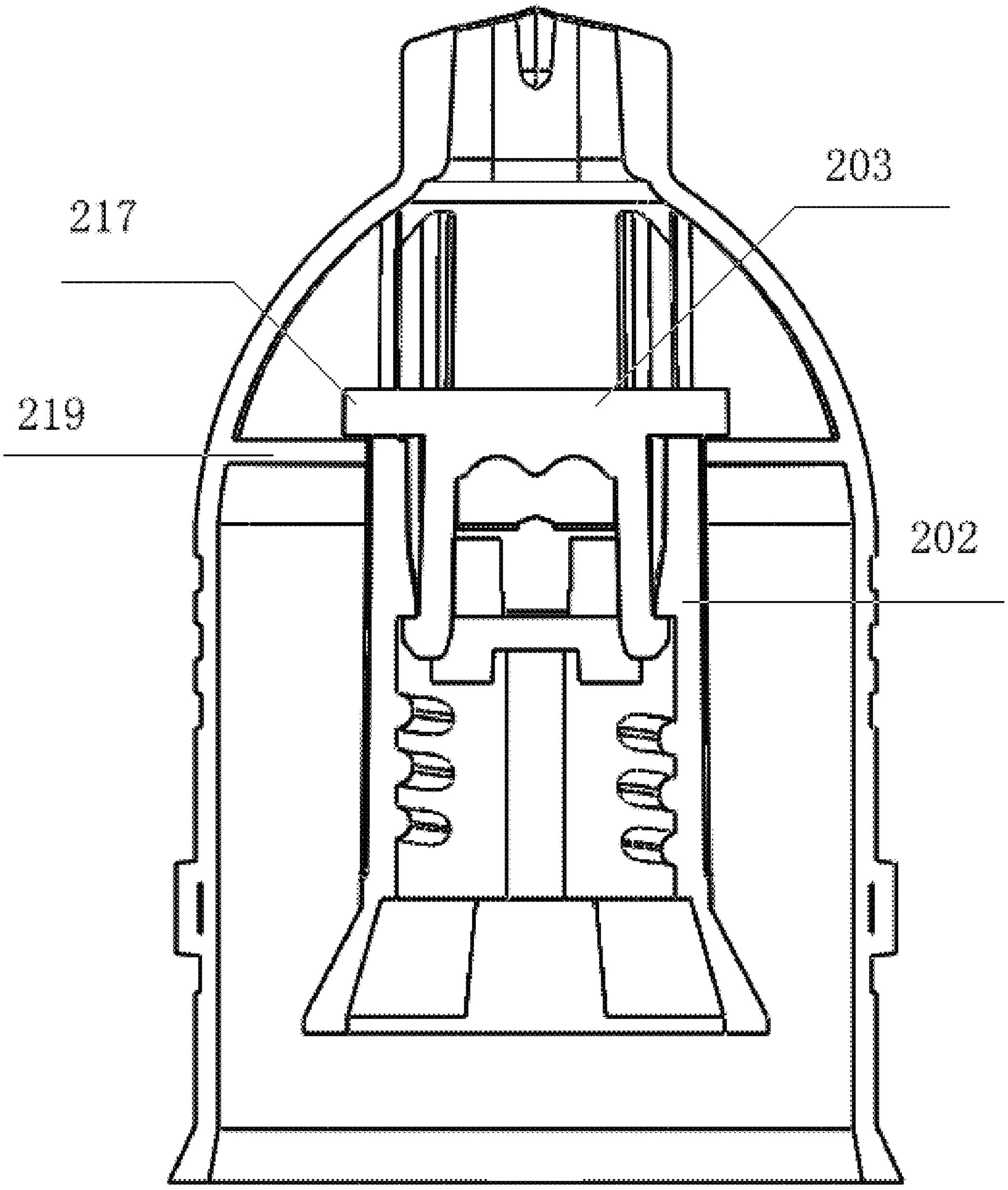
FIG. 11 is a schematic diagram of installation of a preferred embodiment of a lamp cap connecting structure with stable connection provided by the present invention.

Embodiment 5: As shown in FIG. 9 to FIG. 11, both sides of the top of the main body of the connecting piece II203 are provided with snap-fit features III217 symmetrically; correspondingly, the connecting piece I202 is provided with clamping grooves 218; and during assembling, the snap-fit features III217 are located in the clamping grooves 218. The limiting ribs 208 are eliminated from the inner wall of the lamp cap shell 201, and a ring-shaped limiting plate 219 is arranged; the limiting plate 219 is provided with notches 220 symmetrically; and a length of the notches 220 is not less than a width of the snap-fit features III217. This is a second connection mode between the connecting piece I202 and the lamp cap shell 201. The snap-fit features III217 are connected to the ring-shaped limiting plate 219 through the notches 220. After rotation, the snap-fit features III217 are hung and buckled on the ring-shaped limiting plate 219 to form limiting. A length of the snap-fit features III217 is not less than an outside diameter of the connecting piece I202. Only when a length difference is present, that is, when the limiting structure extends from an outer contour of the connecting piece I202, it can achieve that the connecting piece II203 and the connecting piece I202 are hung as a whole on the inner wall of the lamp cap shell 201.

Figure 12:
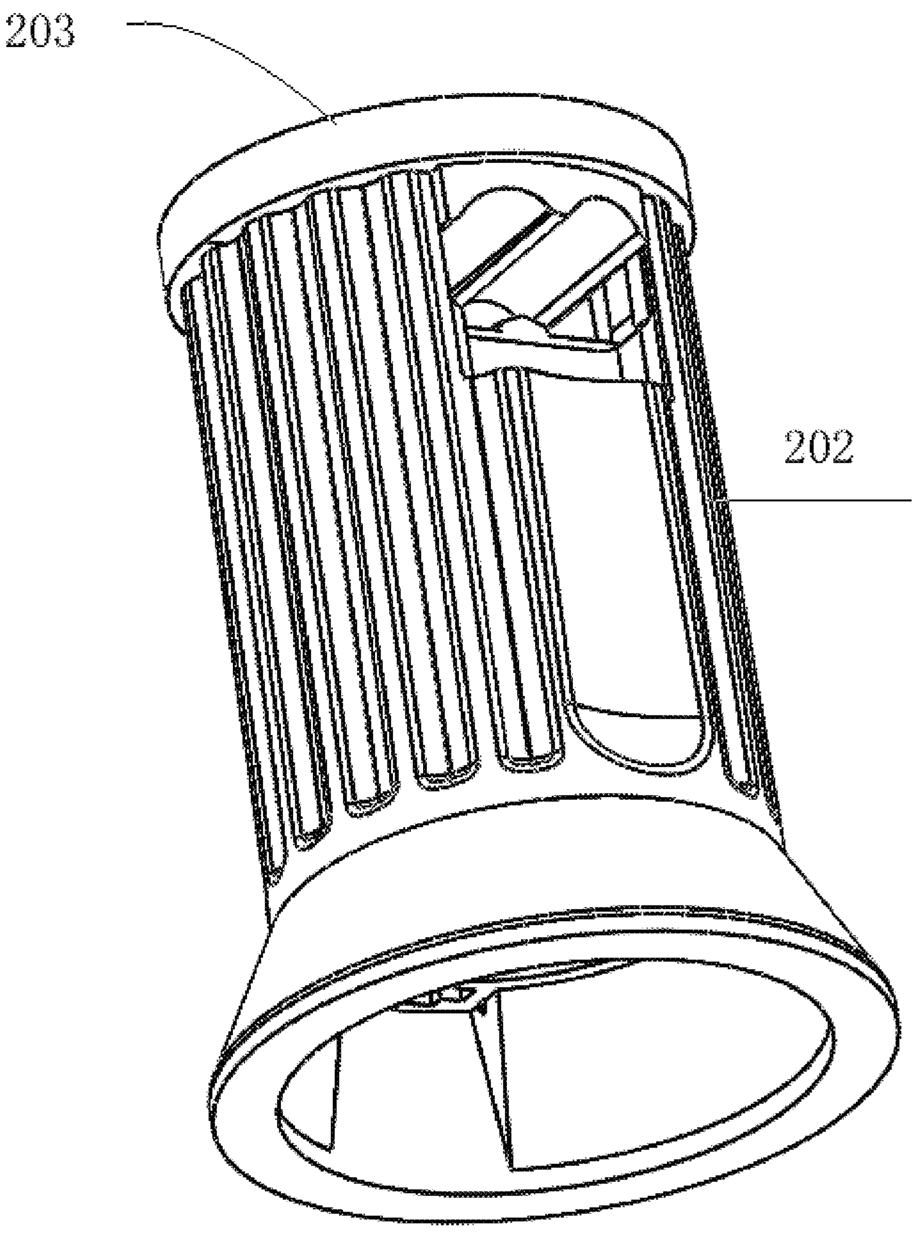
FIG. 12 is a schematic diagram of installation of a preferred embodiment of a lamp cap connecting structure with stable connection provided by the present invention.
Figure 13:
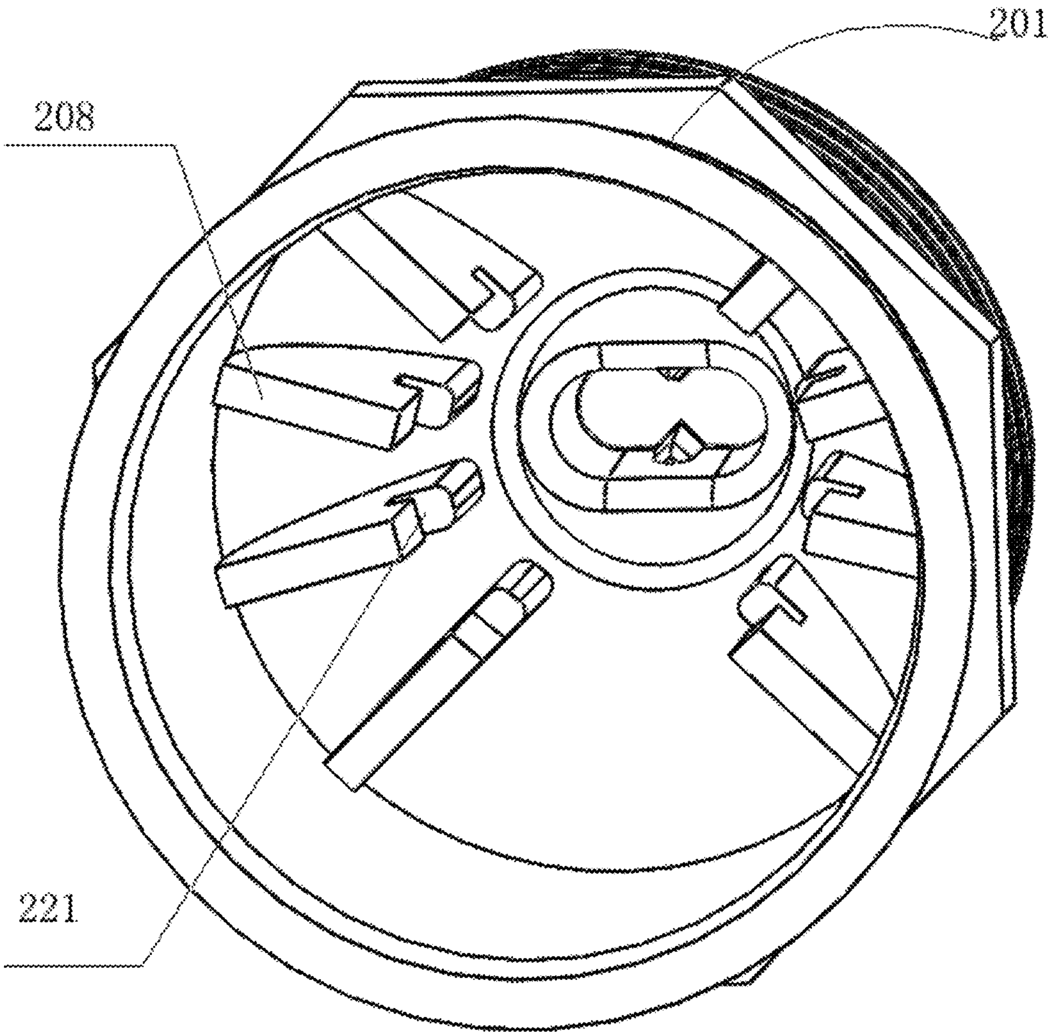
FIG. 13 is a schematic diagram of installation of a preferred embodiment of a lamp cap connecting structure with stable connection provided by the present invention.

Embodiment 6: As shown in FIG. 12 to FIG. 13, an outside diameter of the main body of the connecting piece II203 is greater than the outside diameter of the connecting piece I202, and the limiting ribs 208 on the inner wall of the lamp cap shell 201 are provided with limiting grooves 221 of an equal height. This is a third connection mode between the connecting piece I202 and the lamp cap shell 201. During assembling, due to the particular elasticity of the limiting ribs 208, a part, which exceeds the outer contour of the connecting piece I202, of an outer contour of the main body of the connecting piece II203 is buckled into the limiting grooves 221, which can achieve that the connecting piece II203 and the connecting piece I202 are hung as a whole on the inner wall of the lamp cap shell 201.

Figure 14:
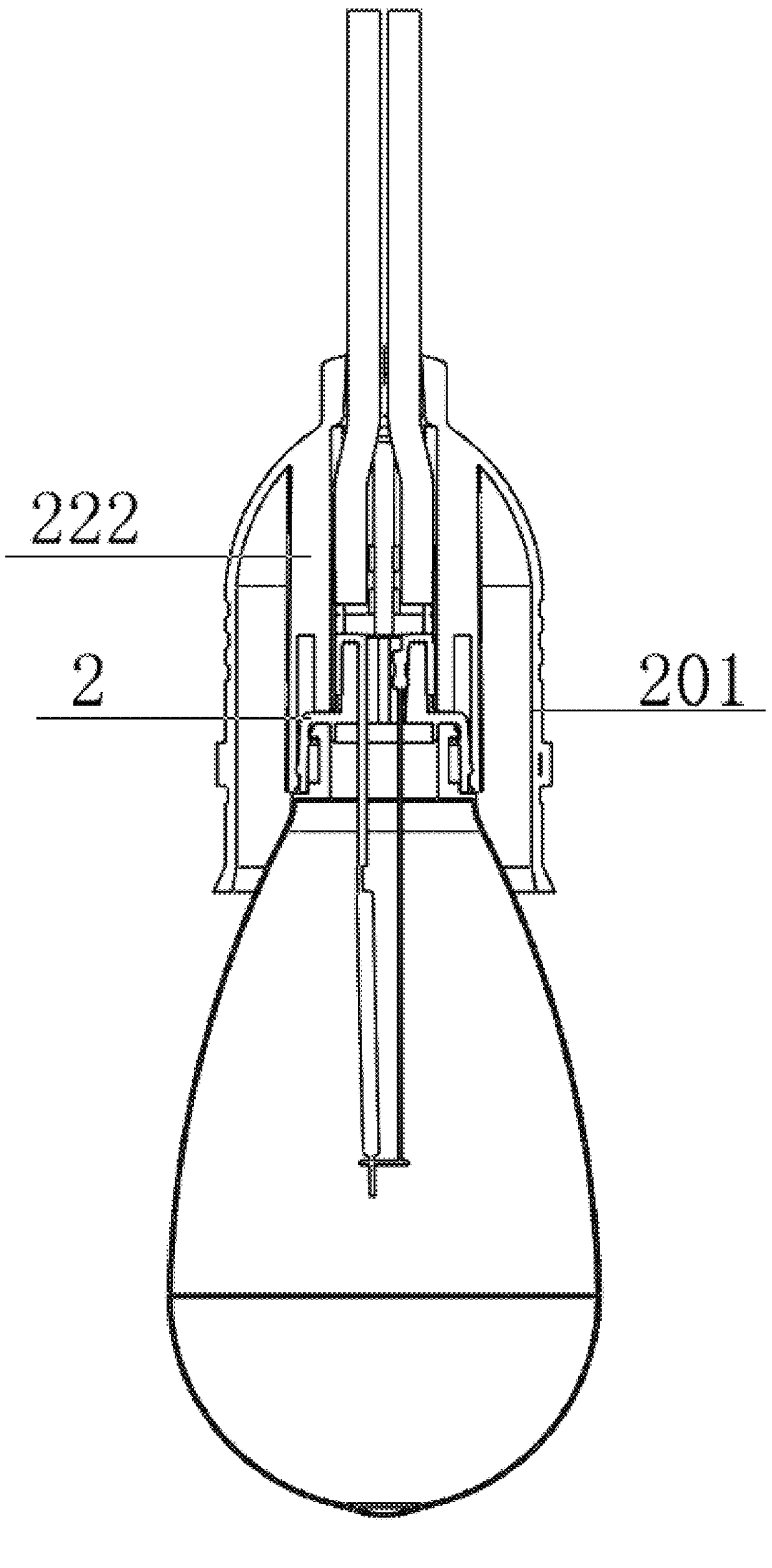
FIG. 14 is a schematic diagram of installation of a preferred embodiment of a lamp cap connecting structure with stable connection provided by the present invention.
Figure 15:
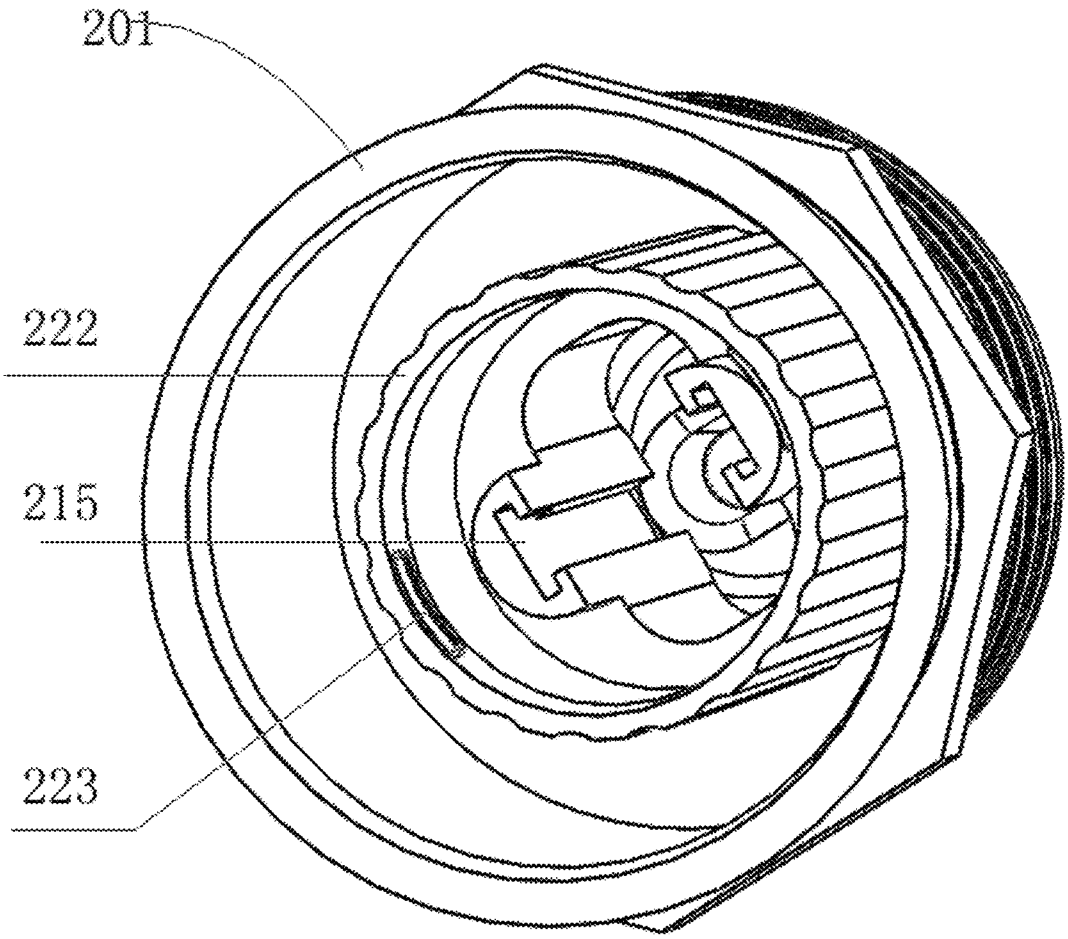
FIG. 15 is a schematic diagram of installation of a preferred embodiment of a lamp cap connecting structure with stable connection provided by the present invention.
Figure 16:
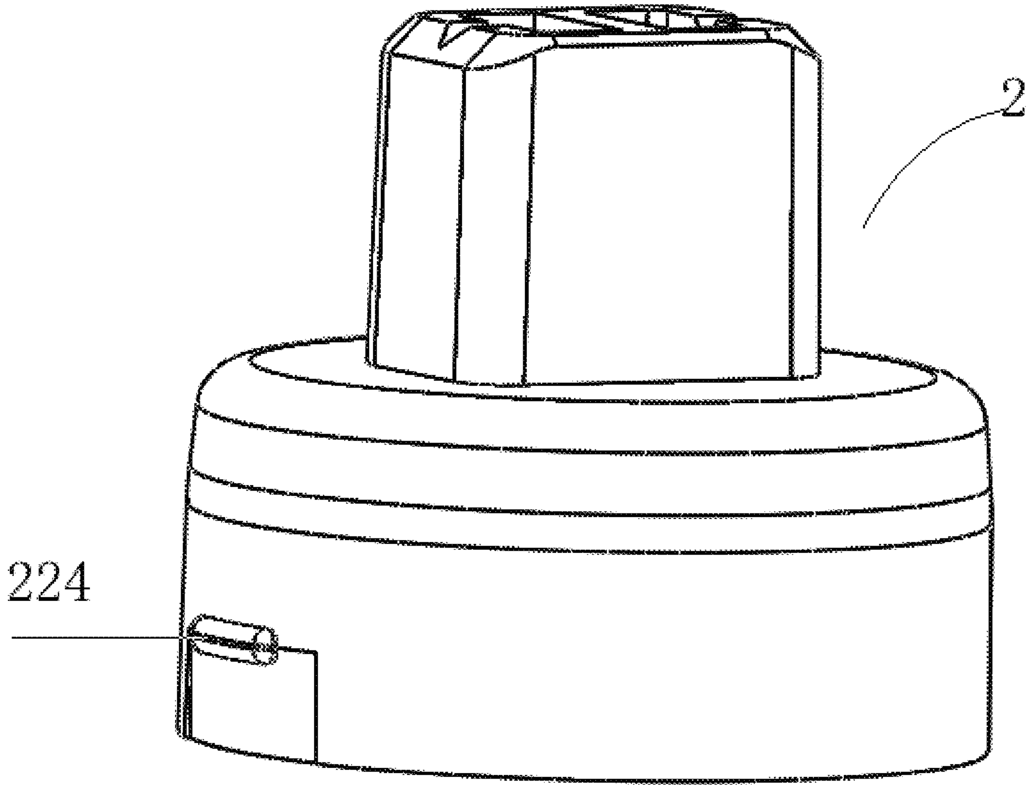
FIG. 16 is a schematic diagram of installation of a preferred embodiment of a lamp cap connecting structure with stable connection provided by the present invention.

Embodiment 7: As shown in FIG. 14 to FIG. 16, the limiting ribs 208 are eliminated from the inner wall of the lamp cap shell 201, so that the inner wall of the lamp cap shell is designed as a cylindrical limiting grooved plate 222; a bottom of the limiting grooved plate 222 is provided with a clamping groove II223; the lamp cap assembly 2 is designed as an integrated structure, and an outer wall of the lamp cap assembly 2 is provided with a snap-fit feature IV224; and during assembling, the snap-fit feature IV224 is located in the clamping groove II223, thereby further simplifying the structure. The lamp cap assembly 2 is used as the integrated structure. A wire crimping groove 215 is mounted in the limiting grooved plate 222, the wire is snap-fitted on the inner wall of the limiting grooved plate 222, and the lamp cap assembly 2 is installed on the inner wall of the lamp cap shell 1 in the form of snap fitting. During assembling, a hardware terminal is hinged to an end of the wire and directly inserted into the wire crimping groove 215; and then, the light-emitting body 1 and the lamp cap assembly 2 are snap-fitted together on the inner wall of the lamp cap shell 201, to form installation.

The above only describes preferred implementations of the present invention and is not intended to limit the present invention. For those skilled in the art, various variations and changes can be made to the present invention. Any modification, equivalent replacement, improvement, etc. made within the spirit and the principle of the present invention shall be included within the protection scope of the present invention.

What is claimed is:

1. A lamp cap connecting structure with stable connection, comprising a light-emitting body, a lamp cap shell and a lamp cap assembly, wherein the lamp cap assembly comprises a connecting piece I and a connecting piece II, the connecting piece II is snap-fitted on a top of the connecting piece I for fixing an external cable, and the connecting piece I is mounted on an inner wall of the lamp cap shell for connecting the light-emitting body, wherein the top of the connecting piece I is connected to the connecting piece II; the top of the connecting piece I is provided with an installing groove; the connecting piece II is mounted in the installing groove; both sides of the connecting piece II are provided with snap-fit features I; ends of the snap-fit features I are of hook structures; correspondingly, an inner wall of the connecting piece I is provided with a limiting lug boss I; the inner wall of the lamp cap shell is provided with limiting ribs; a top end of each limiting rib is provided with a limiting lug boss II; a bottom end of each limiting rib is provided with a snap-fit feature II; an end of the snap-fit feature II is of a hook structure; and during assembling, the top of the connecting piece I is abutted against the limiting lug boss II, and an edge of a bottom port of the connecting piece I is abutted against the snap-fit feature II.

2. The lamp cap connecting structure with stable connection according to claim 1, wherein an outer wall of the connecting piece I is provided with a limiting strip; both sides of the limiting strip are provided with grooves I docked with the limiting ribs; the outer wall of the connecting piece I is provided with a groove II on the other side opposite to the limiting strip; and during assembling, the limiting ribs are located in the groove II.

3. The lamp cap connecting structure with stable connection according to claim 1, wherein a main body of the connecting piece II is a cylindrical structural piece, and is provided with limiting pieces on both sides; the limiting pieces are of structures protruding outwardly from both sides of the main body of the connecting piece II; the limiting pieces and the connecting piece II are all installed in the installing groove; an inner wall of the installing groove is attached to an outer wall of the main body of the connecting piece II; and a side of the connecting piece II opposite to the connecting piece I is provided with a wire crimping groove.

4. The lamp cap connecting structure with stable connection according to claim 1, wherein a top of the lamp cap shell is provided with a wire guide hole located between the limiting ribs docked with the grooves I and the groove II, and is also provided with no less than two limiting ribs, and correspondingly, an outer wall of the connecting piece I is provided with no less than two grooves I.

5. The lamp cap connecting structure with stable connection according to claim 4, wherein the limiting ribs are integrally formed structural pieces on the inner wall of the lamp cap shell, are overall of sheet-like structures, and are in attached contact with the grooves I and the groove II on the outer wall of the connecting piece I.

6. The lamp cap connecting structure with stable connection according to claim 1, wherein both sides of the top of the main body of the connecting piece II are provided with snap-fit features III symmetrically; correspondingly, the connecting piece I is provided with clamping grooves; and during assembling, the snap-fit features III are located in the clamping grooves.

7. The lamp cap connecting structure with stable connection according to claim 6, wherein the inner wall of the lamp cap shell is provided with a ring-shaped limiting plate; the limiting plate is provided with notches symmetrically; and lengths of the notches are not less than widths of the snap-fit features III.

8. The lamp cap connecting structure with stable connection according to claim 6, wherein lengths of the snap-fit features III are greater than an outside diameter of the connecting piece I.

9. The lamp cap connecting structure with stable connection according to claim 1, wherein an outside diameter of the main body of the connecting piece II is greater than the outside diameter of the connecting piece I, and the limiting ribs on the inner wall of the lamp cap shell are provided with limiting grooves of an equal height.

10. The lamp cap connecting structure with stable connection according to claim 1, wherein the inner wall of the lamp cap shell is designed as a cylindrical limiting grooved plate;

a bottom of the limiting grooved plate is provided with a clamping groove II; the lamp cap assembly is designed as an integrated structure, and an outer wall of the lamp cap assembly is provided with a snap-fit feature IV; and during assembling, the snap-fit feature IV is located in the clamping groove II.

11. The lamp cap connecting structure with stable connection according to claim 1, wherein an edge of the wire guide hole on the top of the lamp cap shell is provided with a structure of a thin film, and the thin film has an inclined surface from a position close to a wire to the top of the lamp cap shell from top to bottom.

* * * * *